United States Patent
Francini et al.

(10) Patent No.: US 11,425,592 B2
(45) Date of Patent: Aug. 23, 2022

(54) PACKET LATENCY REDUCTION IN MOBILE RADIO ACCESS NETWORKS

(71) Applicant: Nokia Solutions and Networks Oy, Espoo (FI)

(72) Inventors: Andrea Francini, New Providence, NJ (US); Rajeev Kumar, Jersey City, NJ (US); Sameerkumar Sharma, Holmdel, NJ (US)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 16/639,823

(22) PCT Filed: Sep. 12, 2017

(86) PCT No.: PCT/US2017/051083
§ 371 (c)(1),
(2) Date: Feb. 18, 2020

(87) PCT Pub. No.: WO2019/054984
PCT Pub. Date: Mar. 21, 2019

(65) Prior Publication Data
US 2020/0260317 A1     Aug. 13, 2020

(51) Int. Cl.
*H04W 28/02* (2009.01)
*H04L 1/18* (2006.01)
(Continued)

(52) U.S. Cl.
CPC ........ *H04W 28/0257* (2013.01); *G06F 3/067* (2013.01); *G06F 3/0611* (2013.01);
(Continued)

(58) Field of Classification Search
None
See application file for complete search history.

(56) References Cited

U.S. PATENT DOCUMENTS 8,817,806 B2 *   8/2014   Kim .................. H04L 43/00
                                                         370/413
9,179,357 B2 *  11/2015   Manna .............. H04W 72/0446
                          (Continued)

FOREIGN PATENT DOCUMENTS

AU     2008308944 A1 *   4/2009   ........... H04L 47/283
CN       1669019 A       9/2005
                    (Continued)

OTHER PUBLICATIONS

'Dynamic Control of RLC Buffer Size for Latency Minimization in Mobile RAN' by Rajeev Kumar, 2018 IEEE Wireless Communications and Networking Conference (WCNC). (Year: 2018).*
(Continued)

*Primary Examiner* — Steven G Snyder
(74) *Attorney, Agent, or Firm* — Squire Patton Boggs (US) LLP

(57) ABSTRACT

Systems, methods, apparatuses, and computer program products for packet latency reduction in mobile radio access networks. One method may include, when a buffer of a first sublayer of a wireless access link is empty and there is a new data unit in the first sublayer or when the first sublayer buffer is not empty and a data unit leaves a second sublayer buffer, comparing the number of data units currently stored in the second sublayer buffer with a queue length threshold that defines a total amount of space in the second sublayer buffer. When the number of data units currently stored in the second sublayer buffer is less than the queue length threshold, the method may also include transferring the data unit from the first sublayer to the second sublayer.

11 Claims, 9 Drawing Sheets

(51) Int. Cl.
  *H04W 28/08* (2009.01)
  *H04W 80/02* (2009.01)
  *G06F 3/06* (2006.01)
  *H04L 47/30* (2022.01)

(52) U.S. Cl.
  CPC .......... *G06F 3/0656* (2013.01); *H04L 1/1874* (2013.01); *H04L 47/14* (2013.01); *H04W 28/0278* (2013.01); *H04W 28/085* (2013.01); *H04W 80/02* (2013.01); *H04L 47/30* (2013.01)

(56) References Cited

U.S. PATENT DOCUMENTS

| | | | |
|---|---|---|---|
| 9,232,430 B2* | 1/2016 | Sågfors | H04L 43/0852 |
| 10,038,639 B2 | 7/2018 | Francini et al. | |
| 10,560,358 B2* | 2/2020 | Yi | H04L 43/106 |
| 2004/0218617 A1* | 11/2004 | Sagfors | H04L 47/26 370/412 |
| 2004/0228285 A1 | 11/2004 | Moon et al. | |
| 2006/0133309 A1* | 6/2006 | Mathis | H04L 47/34 370/328 |
| 2008/0008203 A1 | 1/2008 | Frankkila et al. | |
| 2008/0084822 A1* | 4/2008 | Sagfors | H04L 47/11 370/235 |
| 2008/0130619 A1* | 6/2008 | Cha | H04L 1/1685 370/346 |
| 2009/0103478 A1* | 4/2009 | Sammour | H04L 69/324 370/328 |
| 2009/0124259 A1* | 5/2009 | Attar | H04L 47/34 455/436 |
| 2009/0170556 A1* | 7/2009 | Yamasaki | H04W 28/12 455/552.1 |
| 2010/0039938 A1 | 2/2010 | Sagfors | |
| 2010/0118781 A1 | 5/2010 | Petrovic et al. | |
| 2011/0038264 A1* | 2/2011 | Ishii | H04L 47/14 370/238 |
| 2011/0188377 A1* | 8/2011 | Kim | H04L 49/9021 370/235 |
| 2011/0299681 A1 | 12/2011 | Kubota et al. | |
| 2012/0134354 A1 | 5/2012 | Lucky et al. | |
| 2013/0163430 A1* | 6/2013 | Gell | H04N 21/23805 370/235 |
| 2014/0341013 A1 | 11/2014 | Kumar et al. | |
| 2015/0215807 A1* | 7/2015 | Sagfors | H04L 43/0852 370/232 |
| 2015/0257033 A1* | 9/2015 | Manna | H04L 47/28 370/232 |
| 2016/0088127 A1* | 3/2016 | Cai | H04W 36/023 370/328 |
| 2016/0142934 A1* | 5/2016 | Ahmadzadeh | H04W 72/04 370/328 |
| 2017/0013500 A1* | 1/2017 | Ji | H04W 28/0226 |
| 2017/0295113 A1 | 10/2017 | Francini et al. | |
| 2018/0124642 A1* | 5/2018 | Phuyal | H04W 24/10 |
| 2018/0132133 A1* | 5/2018 | Takahashi | H04L 1/1607 |
| 2018/0219789 A1* | 8/2018 | Chaudhuri | H04L 47/32 |
| 2019/0007291 A1* | 1/2019 | Yi | H04W 24/08 |
| 2019/0364137 A1* | 11/2019 | Liu | H04L 47/2433 |
| 2020/0084668 A1* | 3/2020 | Eriksson | H04L 47/2416 |
| 2020/0112879 A1* | 4/2020 | Shimoda | H04W 28/06 |
| 2020/0145873 A1* | 5/2020 | Park | H04L 47/11 |
| 2021/0058812 A1* | 2/2021 | Chai | H04W 24/10 |

FOREIGN PATENT DOCUMENTS

| | | |
|---|---|---|
| CN | 1771686 A | 5/2006 |
| CN | 101483583 A | 7/2009 |
| CN | 101589565 A | 11/2009 |
| CN | 107113649 A | 8/2017 |
| GB | 2372172 A | 8/2002 |
| WO | 2016/186697 A1 | 11/2016 |

OTHER PUBLICATIONS

'5G NR Radio Protocol Stack (Layer 2 and Layer 3)' by Techplayon, Sep. 4, 2017. (Year: 2017).*

Extended European Search Report received for corresponding European Patent Application No. 17925447.9, dated Dec. 15, 2020, 6 pages.

McKenney, "Stochastic Fairness Queuing", Proceedings. IEEE INFOCOM, Jun. 3-7, 1990, pp. 733-740.

International Search Report and Written Opinion received for corresponding Patent Cooperation Treaty Application No. PCT/US2017/051083, dated Nov. 16, 2017, 10 pages.

Office Action issued in corresponding Chinese Patent Application No. 201780094781.7 dated Dec. 30, 2021, with English summary thereof.

Nokia Networks, "Enhanced QoS use case scope", R2-152397, 3GPP TSG-RAN WG2 Meeting #90, May 25, 2015.

Qualcomm Incorporated, "UL scheduling delay measurement", R2-154549, 3GPP TSG-RAN WG2 Meeting #91 bis, Oct. 5, 2015.

Ritesh Shreevastav et al., "Dynamic RLC Mode Based Upon Link Adaptation to Reduce Latency and Improve Throughput in Cellular Networks", IEEE, Oct. 22, 2016.

Li Heng, "Design and Implementation of RLC Layer Protocol Software for Wireless Ad Hoc Network Based on TDMA", abstract, CNKI, Mar. 13, 2015.

* cited by examiner

PACKET LATENCY REDUCTION IN MOBILE RADIO ACCESS NETWORKS

RELATED APPLICATION

This application was originally filed as PCT Application No. PCT/US2017/051083 filed Sep. 12, 2017.

BACKGROUND

Field

Embodiments of the invention generally relate to mobile radio access networks, such as, but not limited to, the Universal Mobile Telecommunications System (UMTS) Terrestrial Radio Access Network (UTRAN), Long Term Evolution (LTE) Evolved UTRAN (E-UTRAN), LTE-Advanced (LTE-A), LTE-A Pro, and/or 5G radio access technology or new radio (NR) access technology. Some embodiments may generally relate to reducing the latency time of data packets in a protocol stack of a radio access network (RAN), for example.

Description of the Related Art

Universal Mobile Telecommunications System (UMTS) Terrestrial Radio Access Network (UTRAN) refers to a communications network including base stations, or Node Bs, and for example radio network controllers (RNC). UTRAN allows for connectivity between the user equipment (UE) and the core network. The RNC provides control functionalities for one or more Node Bs. The RNC and its corresponding Node Bs are called the Radio Network Subsystem (RNS). In case of E-UTRAN (Evolved-UTRAN), the air interface design, protocol architecture and multiple-access principles are new compared to that of UTRAN, and no RNC exists and radio access functionality is provided by an evolved Node B (eNodeB or eNB) or many eNBs. Multiple eNBs are involved for a single UE connection, for example, in case of Coordinated Multipoint Transmission (CoMP) and in dual connectivity.

Long Term Evolution (LTE) or E-UTRAN improves efficiency and services, offers lower costs, and provides new spectrum opportunities, compared to the earlier generations. In particular, LTE is a 3GPP standard that provides for uplink peak rates of at least, for example, 75 megabits per second (Mbps) per carrier and downlink peak rates of at least, for example, 300 Mbps per carrier. LTE supports scalable carrier bandwidths from 20 MHz down to 1.4 MHz and supports both Frequency Division Duplexing (FDD) and Time Division Duplexing (TDD). Carrier aggregation or said dual connectivity further allows operating on multiple component carriers at the same time hence multiplying the performance such as data rates per user.

As mentioned above, LTE may also improve spectral efficiency in networks, allowing carriers to provide more data and voice services over a given bandwidth. Therefore, LTE is designed to fulfill the needs for high-speed data and media transport in addition to high capacity voice support. Advantages of LTE include, for example, high throughput, low latency, FDD and TDD support in the same platform, an improved end-user experience, and a simple architecture resulting in low operating costs.

Certain further releases of 3GPP LTE (e.g., LTE Rel-10, LTE Rel-11) are targeted towards international mobile telecommunications advanced (IMT-A) systems, referred to herein for convenience simply as LTE-Advanced (LTE-A).

LTE-A is directed toward extending and optimizing the 3GPP LTE radio access technologies. A goal of LTE-A is to provide significantly enhanced services by means of higher data rates and lower latency with reduced cost. LTE-A is a more optimized radio system fulfilling the international telecommunication union-radio (ITU-R) requirements for IMT-Advanced while maintaining backward compatibility. One of the key features of LTE-A, introduced in LTE Rel-10, is carrier aggregation, which allows for increasing the data rates through aggregation of two or more LTE carriers. The next releases of 3GPP LTE (e.g. LTE Rel-12, LTE Rel-13, LTE Rel-14, LTE Rel-15) are targeted for further improvements of specialized services, shorter latency and meeting requirements approaching the 5G.

$5^{th}$ generation (5G) or new radio (NR) wireless systems refer to the next generation (NG) of radio systems and network architecture. 5G is also known to appear as the IMT-2020 system. It is estimated that 5G will provide bitrates on the order of 10-20 Gbit/s or higher. 5G will support at least enhanced mobile broadband (eMBB) and ultra-reliable low-latency-communication (URLLC). 5G is also expected to increase network expandability up to hundreds of thousands of connections. The signal technology of 5G is anticipated for greater coverage as well as spectral and signaling efficiency. 5G is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. In 5G or NR, the Node B or eNB may be referred to as a next generation or 5G Node B (gNB).

SUMMARY

One embodiment is directed to a method that may include, when a buffer of a first sublayer of a wireless access link is empty and there is a new data unit in the first sublayer or when the first sublayer buffer is not empty and a data unit leaves a second sublayer buffer, comparing the number of data units currently stored in the second sublayer buffer with a queue length threshold that defines a total amount of space in the second sublayer buffer. When the number of data units currently stored in the second sublayer buffer is less than the queue length threshold, the method may also include transferring the data unit from the first sublayer to the second sublayer.

Another embodiment is directed to an apparatus that includes, when a buffer of a first sublayer of a wireless access link is empty and there is a new data unit in the first sublayer or when the first sublayer buffer is not empty and a data unit leaves a second sublayer buffer, comparing means for comparing the number of data units currently stored in the second sublayer buffer with a queue length threshold that defines a total amount of space in the second sublayer buffer. When the number of data units currently stored in the second sublayer buffer is less than the queue length threshold, the apparatus may also include transferring means for transferring the data unit from the first sublayer to the second sublayer.

Another embodiment is directed to an apparatus, which may include at least one processor and at least one memory including computer program code. The at least one memory and computer program code may be configured, with the at least one processor, to cause the apparatus at least to, when a buffer of a first sublayer of a wireless access link is empty and there is a new data unit in the first sublayer or when the first sublayer buffer is not empty and a data unit leaves a second sublayer buffer, compare the number of data units currently stored in the second sublayer buffer with a queue length threshold that defines a total amount of space in the second sublayer buffer. When the number of data units currently stored in the second sublayer buffer is less than the queue length threshold, the at least one memory and computer program code may also be configured, with the at least one processor, to cause the apparatus at least to transfer the data unit from the first sublayer to the second sublayer.

Another embodiment is directed to a computer program embodied on a non-transitory computer readable medium. The computer program may be configured to control a processor to perform a process including, when a buffer of a first sublayer of a wireless access link is empty and there is a new data unit in the first sublayer or when the first sublayer buffer is not empty and a data unit leaves a second sublayer buffer, comparing the number of data units currently stored in the second sublayer buffer with a queue length threshold that defines a total amount of space in the second sublayer buffer. When the number of data units currently stored in the second sublayer buffer is less than the queue length threshold, the process may also include transferring the data unit from the first sublayer to the second sublayer.

BRIEF DESCRIPTION OF THE DRAWINGS

For proper understanding of the invention, reference should be made to the accompanying drawings, wherein.

DETAILED DESCRIPTION

It will be readily understood that the components of the invention, as generally described and illustrated in the figures herein, may be arranged and designed in a wide variety of different configurations. Thus, the following detailed description of the embodiments of systems, methods, apparatuses, and computer program products for packet latency reduction in mobile radio access networks, as represented in the attached figures and described below, is not intended to limit the scope of the invention but is representative of selected embodiments of the invention.

The features, structures, or characteristics of the invention described throughout this specification may be combined in any suitable manner in one or more embodiments. For example, the usage of the phrases "certain embodiments," "some embodiments," or other similar language, throughout this specification refers to the fact that a particular feature, structure, or characteristic described in connection with the embodiment may be included in at least one embodiment of the present invention. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more embodiments.

Additionally, if desired, the different functions discussed below may be performed in a different order and/or concurrently with each other. Furthermore, if desired, one or more of the described functions may be optional or may be combined. As such, the following description should be considered as merely illustrative of the principles, teachings and embodiments of this invention, and not in limitation thereof.

Certain embodiments of the present disclosure enable the reduction of the sojourn time of data packets in the protocol stack of a mobile radio access network (RAN). Therefore, some embodiments provide a reduction of the end-to-end latency of the same packets as they move between the endpoints of network applications.

Figure 1:
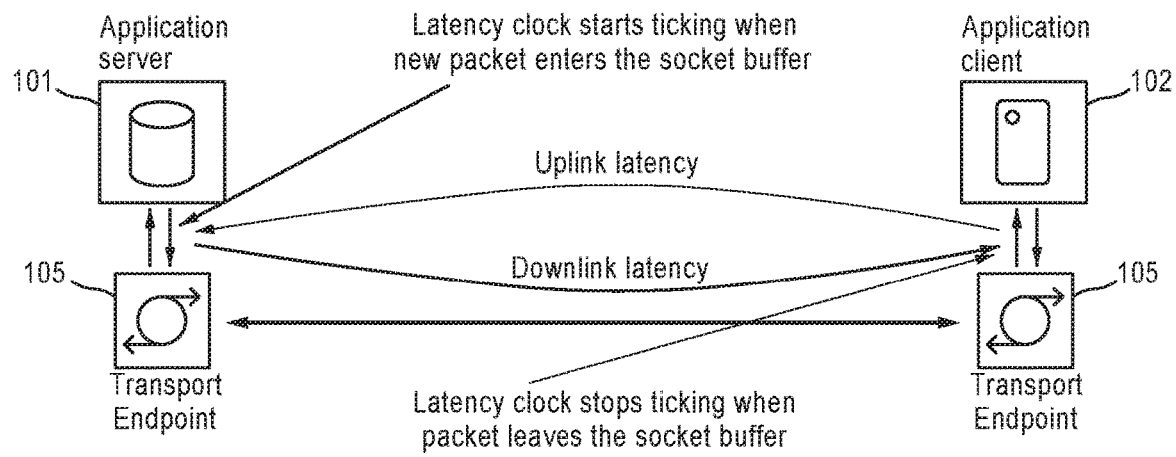
FIG. 1 illustrates an example block diagram of a system, according to an embodiment.

End-to-end packet latency refers to the time between the creation of a data packet at the sender end of a network connection and the consumption of the data packet at the receiver end of the same connection. FIG. 1 illustrates an example block diagram of a system including an application server 101, application client 102, and endpoints 105. In certain embodiments of the present disclosure, the creation of a data packet refers to the action of placing its payload in the transport socket buffer of the sender, which is application server 101 in FIG. 1; while the consumption of the packet is the action of removing its payload from the socket buffer of the receiver, which is application client 102 as shown in FIG. 1. Both transactions may occur between a transport layer socket and an application layer endpoint.

End-to-end packet latency is particularly important for the Quality of Experience (QoE) of a growing set of network applications that involve some degree of interactivity between the connection endpoints. For example, voice and video conferencing packets should reach the receiver within a fixed amount of time (e.g., 100 ms) to be at all usable. As another example, remote desktop applications and remote control of video streaming sessions are considered properly functional if the round-trip time (RTT) between a user action and its effect on the screen is well below 100 ms. Online gaming has similar requirements. The latency bounds become even tighter for successful operation of newer applications, such as augmented reality (AR) and virtual reality (VR), where quality degradations can be perceived as soon as the RTT exceeds 10 ms.

Figure 2:
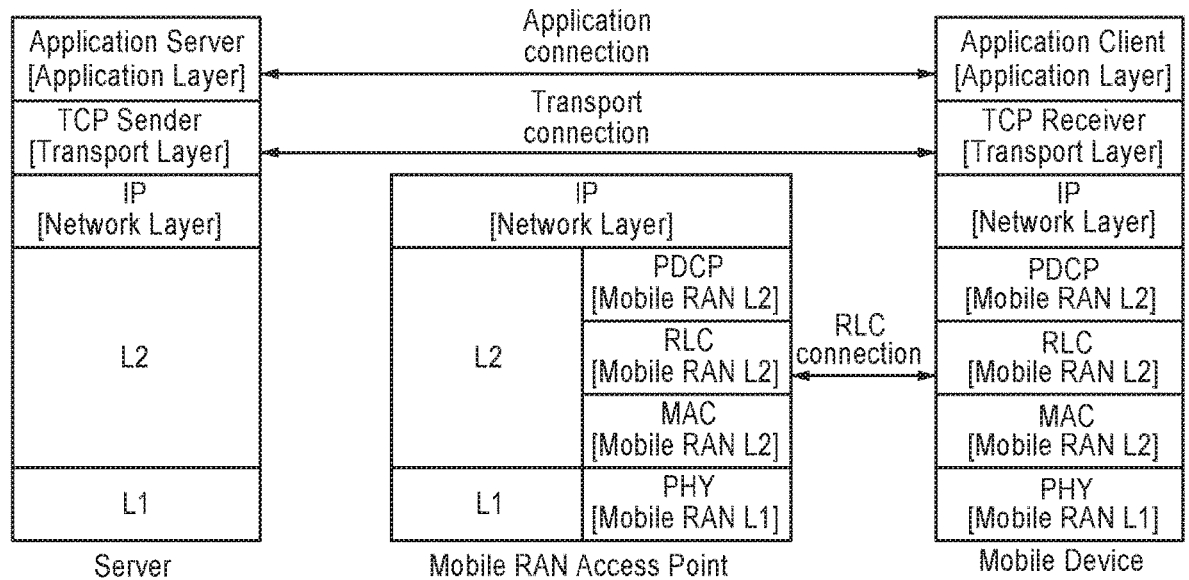
FIG. 2 illustrates an example block diagram of an application client-server connection over a mobile RAN protocol stack, according to an embodiment.

FIG. 2 illustrates an example block diagram of an application client-server connection over a mobile RAN protocol stack. The protocol stack of a mobile RAN includes multiple layers and sub-layers. Certain embodiments of the present disclosure may focus on the link layer of the wireless access link Referring to the protocol stack of 3GPP mobile wireless networks (UMTS and LTE) as an example, the link layer is subdivided into three distinct sublayers. From top to bottom, they are called the Packet Data Convergence Protocol (PDCP), the Radio Link Control (RLC), and the Medium Access Control (MAC). The RLC sublayer may operate in three distinct modes: Transparent (RLC-TM), Unacknowledged (RLC-UM), and Acknowledged (RLC-AM).

In RLC-AM, a data unit is deemed delivered to the receiver end of the wireless link only after the sender has obtained from the receiver an explicit acknowledgment of the successful transmission. This implies that every RLC-AM instance must include a packet buffer at least for holding transmitted packets that have not yet been acknowledged by the receiver. Since the wireless link must be capable of buffering packets when the link bandwidth drops below the transmission rate of the source, the necessity of an RLC-AM buffer has ended up making the RLC sublayer the default location for link-layer buffering. This choice is not mandated by 3GPP standards, but is a straightforward one when trying to avoid multiple buffering points in the protocol stack, especially when latency minimization is required. However, buffering in the PDCP sublayer is not unusual, especially when the PDCP and RLC instances are not co-located (e.g., because they are implemented in distinct hardware components).

An important feature of RLC-UM and RLC-AM is the segmentation and concatenation of RLC service data units (SDUs) into RLC protocol data units (PDUs). As an immediate consequence of this function, which is needed to maximize the efficiency of use of the air-interface bandwidth, an IP packet can be distributed over multiple RLC PDUs, and an RLC PDU may contain fragments of multiple IP packets. The latter point is particularly relevant to latency minimization. Since the same RLC PDU can carry fragments of different IP packets, and those IP packets may belong to flows from different applications, the distribution of service to flows served by the same RLC instance may be controlled entirely by the order of transmission (RLC-UM) or acknowledgment (RLC-AM) of the RLC PDUs. This implies that it is not possible to differentiate service on a per-flow basis within the RLC sublayer. Rather, such service differentiation would only be possible in RLC instances where segmentation and concatenation are not supported. The absence of per-flow service differentiation translates into a first-in-first-out (FIFO) shared-queue arrangement within the RLC sublayer for all application flows carried by the same bearer. Latency minimization in a queue shared by flows from multiple applications relies entirely on maintaining the occupancy of the RLC buffer at the lowest level that does not degrade the bearer throughput.

A brute-force method to ensure that the end-to-end latency requirements of an application are always met is to overprovision the bandwidth of the end-to-end data path. If the bandwidth of every link in the data path always exceeds the demand of the packet flow of the application, the end-to-end latency is practically dominated by the propagation component, and therefore by the physical length of the path. However, this condition is not easy to obtain and maintain, for at least three common reasons discussed below.

If the application uses the TCP protocol for transport, its packet flow typically tends to saturate the bandwidth available at the slowest link in the data path (commonly called the "bottleneck link"). After saturation of the bottleneck bandwidth, any difference between the transmission rate of the sender and the link bandwidth translates into an accumulation of queuing delay in the link buffer, which in turn contributes to an end-to-end latency increase beyond the bare propagation component. In principle, it is never possible to overprovision the bottleneck bandwidth of a TCP flow, because the TCP source is designed exactly around the goal of saturating that bandwidth.

When the packet flow of a TCP connection shares the packet buffer of the bottleneck link with packet flows generated by other applications, it increases the end-to-end packet latency of those flows. While many queue management policies have been devised that limit the latency contribution of the shared packet buffer, the same policies also introduce packet losses that may interfere with the intended operation of some of those applications.

In end-to-end data paths that include wireless links, the bottleneck bandwidth is typically determined by the state of one of those links. Due to the variability of the physical conditions of the wireless link, the bandwidth available to an application flow varies more widely and quickly than in the case where all links in the data path are established over a wired medium. Drops in link bandwidth increase the latency of packets that are already in transit between the data source and the bottleneck link, possibly affecting the overall end-to-end latency.

One comprehensive approach to address the above limitations includes allocating per-flow queues in front of the wireless link (the 3GPP radio bearer), and then establishing a direct signalling relationship between each flow queue and the corresponding data source at the server end of the transport connection. The flow-queuing arrangement, which also involves a round-robin scheduler that allocates equal shares of bandwidth to all queues that are busy at a given time, ensures flow isolation, and therefore prevents the packet flow of one application from inflating the end-to-end latency of packets of another flow when the arrival of its packets to the wireless link buffer is not evenly distributed in time. The direct signalling relationship between a queue and the corresponding source additionally enables the control of self-inflicted queuing delay, which is the delay suffered by packets of a flow when many prior packets of the same flow are already standing in the bottleneck buffer.

As discussed above, due to the segmentation and concatenation of data units that occur in RLC-AM and RLC-UM, the RLC sublayer is not amenable to flow-queuing arrangements. Flow queuing must therefore be implemented in the PDCP sublayer of the 3GPP RAN stack (note that a similar stack arrangement is envisioned to remain in place at least for some of the wireless interfaces to be standardized for the fifth-generation mobile wireless network, or 5G). To minimize latency without compromising the throughput of the bearer, the RLC sublayer must be equipped with a packet buffer whose size dynamically adjusts to the bandwidth fluctuations experienced by the bearer.

Certain embodiments of the present disclosure define a system and method for minimizing the sojourn time of data units in the RLC buffer without causing a tangible loss of throughput. In view of the above, some embodiments may solve at least the problem of unpredictable and high end-to-end packet latency for applications running over a mobile access network.

As outlined above, certain embodiments described herein may be applicable to the protocol stack of 3GPP mobile wireless networks, which include the PDCP sublayer, RLC sublayer, and MAC sublayer. However, it should be noted that this is merely one example and other embodiments may also be applicable to other interface layers and are not limited to one type of protocol layer or stack.

Low latency and ultra-low latency are commonly included in the set of new capabilities that upcoming 5G wireless networks and new mobile RAN protocols will enable. It should be noted that there are clear distinctions between those capabilities and the latency improvements made possible by embodiments of the present disclosure. 5G latency improvements target primarily the physical and MAC layers of the wireless interface, for example with new modulation and scheduling schemes. Packets that arrive at empty link buffers are transmitted almost immediately over the wireless interface, with waiting times well below 1 ms. This is indeed a major advance over pre-existing mobile wireless interfaces, such as those adopted for UMTS and LTE. Other enhancements leverage simplifications of the core network protocols to reduce the latency between the time of network attachment of a mobile device and the time of its successful exchange of a first data packet with the network.

The new solutions envisioned for 5G will be beneficial to all types of applications, but will not eliminate all contributions to end-to-end latency. For instance, specifically with respect to applications that use elastic end-to-end transport for maximum utilization of the available radio resources, the new 5G solutions do not address the accumulation of queuing delay at times when the transmission rate of the application data source exceeds the bandwidth of the wireless link ("autogenous delay"), nor the accumulation of queuing delay induced by the activity of other elastic applications that share the same link ("exogenous delay"). Certain embodiments of the present disclosure focus on the mitigation of exogenous delay in a wireless link shared by two or more applications.

Flow queuing is a well-known buffer management scheme that effectively isolates the traffic flows of concurrent applications by ensuring that the short-term bandwidth received by each flow depends exclusively on the number of flows with queued packets and not on the rate and pattern of their packet arrivals. When the link is congested, each flow has its packets stored in a dedicated queue, and a scheduler visits the queues for transmitting their packets based on a pre-defined fairness criterion. Stochastic fairness queuing (SFQ) is a simple way to run a flow queuing arrangement without a-priori knowledge of the nature and requirements of the application traffic to be handled. In SFQ, every incoming packet is mapped onto a queue by hashing the portions of its header that are unique to the respective flow. This way all packets of a flow end up in the same queue. A round-robin scheduler visits the busy queues with even frequency for extraction and transmission of their packets. At every visit, the scheduler may extract a fixed number of queued packets or a fixed number of bytes (for exact throughput fairness). The use of a hash function eliminates the need for provisioning a packet classification rule for every new flow that is established, and for removing it when the flow is torn down. A drawback is the possibility of hash collisions, where packets of distinct flows end up in the same queue. However, the likelihood of collisions can be kept comfortably low by proper sizing of the hash value range. When two flows that share the bottleneck buffer have different packet arrival rates, the faster flow fills its dedicated queue faster than the slower one. When stored packets have exhausted the buffer space allocated to the flow queues of a single link and a new packet arrives, flow isolation is best enforced if a packet is removed from the longest queue in the set.

In a mobile RAN protocol stack, it would be ideal for the minimization of queuing delay and end-to-end latency if there was only one queuing stage and if that stage could be arranged with flow queues. However, as discussed above, the requirement for efficient use of the wireless link bandwidth imposes the instantiation of a single FIFO queue per bearer in the RLC sublayer. Flow queuing can only be implemented in a higher sublayer, best if adjacent to RLC.

Therefore, a bearer that pursues the minimization of exogenous queuing delay must combine a shared FIFO queue in the RLC sublayer with a set of flow queues in the PDCP sublayer. Certain embodiments therefore provide an apparatus and method for minimizing the queuing delay in the shared FIFO queue of the RLC sublayer, in a way that does not degrade the aggregate data throughput of the applications that share the radio bearer (wireless link).

One embodiment is directed to limiting the queuing delay in the RLC packet buffer by controlling the admission of packets from the flow-queuing stage in the PDCP sublayer. The admission control may be driven by a delay threshold (DLT) and effected by a queue length threshold (QLT).

An example of the operation of the RLC buffer control, according to certain embodiments, is as follows. In an embodiment, the RLC buffer may monitor the queuing delay of the service data units (SDUs) it stores based on a preferred delay metric (DLM). For example, the DLM may include, but is not limited to, the average of the delay samples collected over a given time interval, the minimum delay sample collected during the interval, the maximum sample, and/or a moving average of the collected samples. For each SDU, a delay sample may be obtained or calculated as the difference between the time of departure from the buffer and the SDU arrival timestamp, which is stored together with the SDU. The RLC buffer may compute or sample the metric DLM periodically, for example at intervals of duration DMT or delay measurement time. Every time a new sample of DLM is obtained, it may be compared with the DLT. In an embodiment, the comparison may result in at least three possible effects on the QLT. For example, based on the comparison, the QLT may be kept the same, increased, or decreased.

According to one embodiment, the number of SDUs currently stored in the RLC SDU buffer (RQL) may be compared with QLT every time an SDU leaves the RLC buffer. If RQL<QLT, the RLC buffer may request, from the PDCP flow-queue scheduler, the transfer of a PDCP service data unit (SDU) into the RLC sublayer. If a PDCP SDU is found, it may be formatted first as a PDCP PDU, then as an RLC SDU and stored as such at the tail of the RLC FIFO queue. The SDU may also be segmented into RLC PDUs based on standard procedures. Fragments of the SDU may end up concatenated with fragments of other SDUs, possibly from other flows, in a common RLC PDU.

In one embodiment, in RLC-UM, an SDU may be removed from the RLC-UM SDU buffer when all the corresponding PDUs, and most importantly its tail PDU, have been transmitted over the wireless medium. According to an embodiment, in RLC-AM, an SDU may be removed from the RLC-AM SDU buffer when all the corresponding PDUs have been acknowledged by the receiver (accordingly, the measured queuing delay is generally larger for RLC-AM than for RLC-UM when QLT is the same). RQL and QLT may be compared again after the data unit transfer from PDCP to RLC is complete, and then may be repeatedly compared until RQL and QLT are found to be equal. RQL and QLT may also be compared when a new data unit arrives to the PDCP sublayer and finds its buffer empty. In that case, if RQL<QLT, the PDCP SDU may move immediately to the RLC buffer, otherwise it may be stored in the PDCP buffer.

As a result, certain embodiments are able to enforce a desired queuing delay in the RLC sublayer independently of the bandwidth available to the bearer. Thus, the queue length threshold that establishes the desired queuing delay increases with the bandwidth available to the bearer. A fixed QLT would instead let the queuing delay increase as the bandwidth of the bearer decreases. In theory, the desired queuing delay DLT could be made arbitrarily small to satisfy very tight latency requirements. However, in practice the operation and configuration of every RLC instance may impose difficult constraints on the selection of the delay threshold DLT. In the case of RLC-UM, the MAC scheduler may impose time gaps in between PDU transmissions. The delay threshold DLT should not be smaller than such gaps. In the case of RLC-AM, the protocol configuration may impose time gaps between the transmission (from the RLC receiver to the RLC sender) of the status PDUs that acknowledge the reception of data PDUs. These time gaps help improve the overall utilization of the air interface bandwidth. However, if the time gap between status PDUs is larger than the time gap between data PDUs, it becomes the dominant factor for sizing the delay threshold DLT. Thus, an embodiment includes a method for detecting the time gap that the RLC-AM configuration imposes between consecutive status PDU transmissions, and for adjusting the delay threshold DLT accordingly. For instance, one embodiment may measure the time gaps (e.g., by accumulating samples in a moving average called the average time gap ATG), and apply a fixed multiplier FMX to the measure to dynamically set the delay threshold DLT.

Figure 3A:
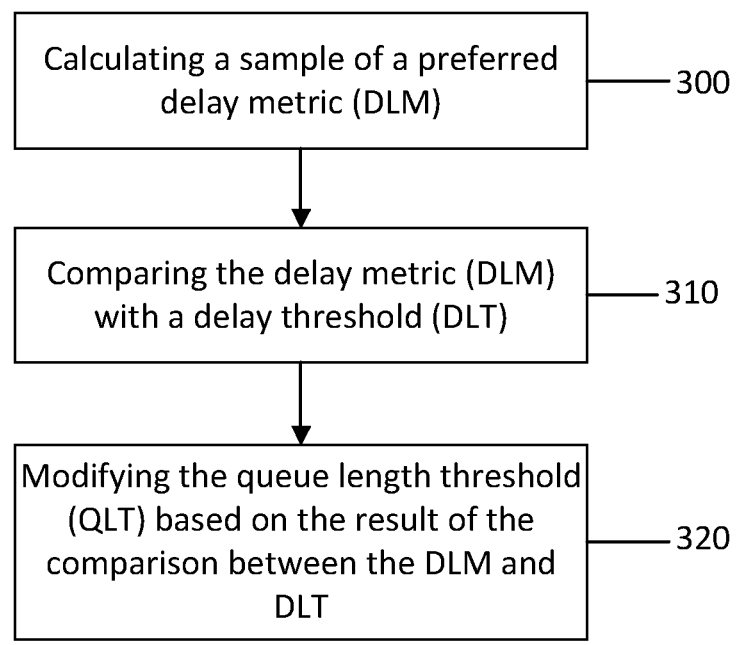
FIG. 3a illustrates an example flow diagram of a method, according to one embodiment.

FIG. 3a illustrates an example flow diagram of a method for monitoring a queuing delay of service data units (SDUs) stored in a second sublayer buffer based on a preferred delay metric, according to one embodiment. In an embodiment, the method of FIG. 3a may be performed by a network node, such as a server, application server, base station, node B, eNB, or gNB, for example. In one example, the second sublayer may be a RLC sublayer. As illustrated in the example of FIG. 3a, the method may include, at 300, for each SDU, calculating a sample of the preferred delay metric (DLM) as the difference between the time of departure from the second sublayer buffer and the SDU arrival timestamp that is stored together with the SDU. In an embodiment, as discussed above, the preferred delay metric may include the average of the delay samples collected over a given time interval, the minimum delay sample collected during the interval, the maximum sample, and/or a moving average of the collected samples.

According to one embodiment, the calculating 300 may include calculating the delay metric (DLM) periodically, for example at intervals of delay measurement time. In one embodiment, the method may further include, at 310, every time a new sample of the delay metric is obtained or after a certain period of time elapses, comparing the delay metric (DLM) with the delay threshold (DLT). In an embodiment, the method may include, at 320, modifying the queue length threshold (QLT) based on the result of the comparison between the DLM and DLT. For example, the modifying 320 may include, based on the comparison, keeping the QLT the same, increasing the QLT, or decreasing the QLT.

Figure 3B:
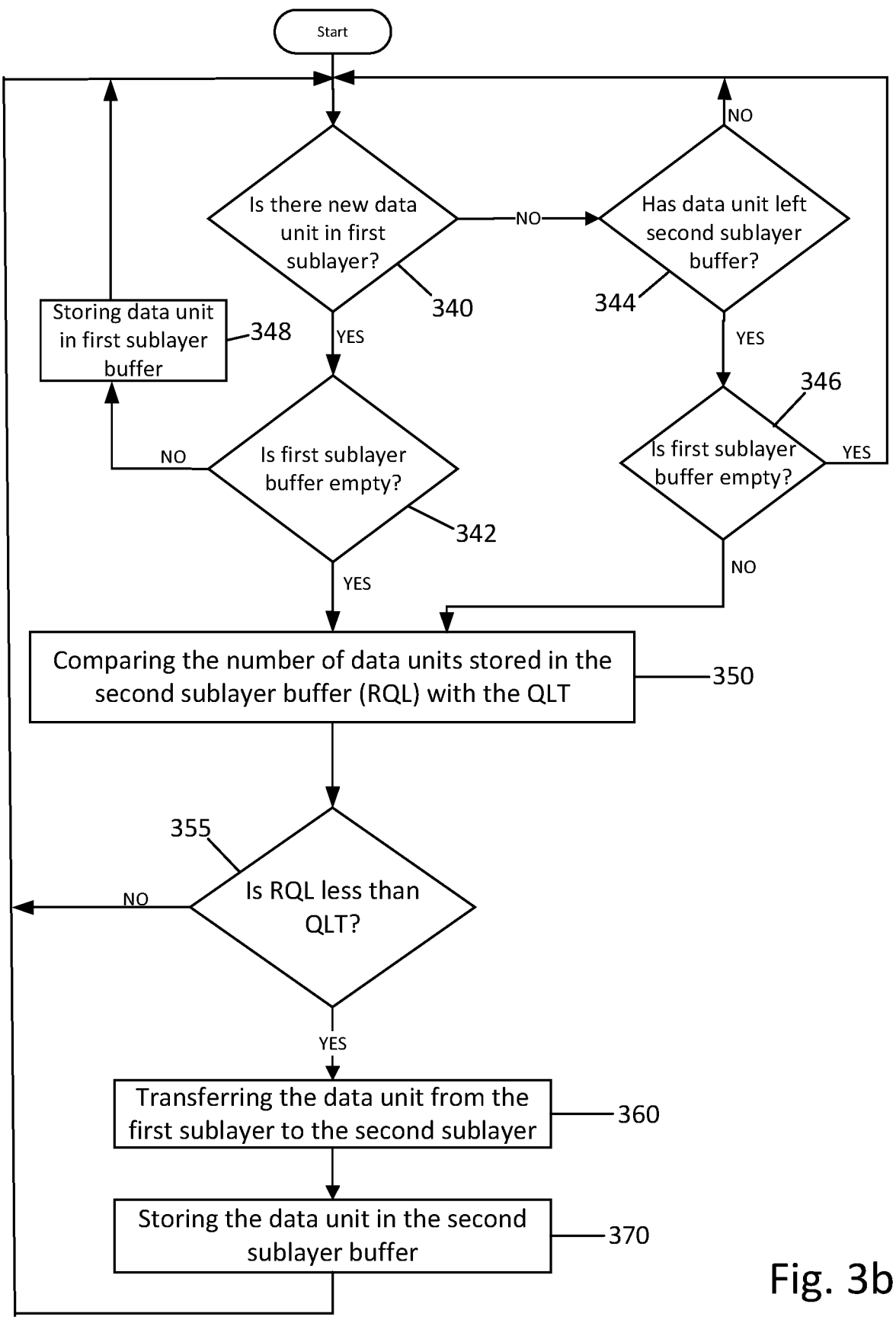
FIG. 3b illustrates an example flow diagram of a method, according to another embodiment.

FIG. 3b illustrates an example flow diagram of a method for limiting the queuing delay in a second sublayer packet buffer by controlling the admission of packets from the flow-queuing stage in a first sublayer, according to one embodiment. In an embodiment, the method of FIG. 3b may be performed by a network node, such as a server, application server, base station, node B, eNB, or gNB, for example. In certain embodiments, the first sublayer may be a PDCP sublayer and the second sublayer may be a RLC sublayer. As illustrated in the example of FIG. 3b, the method may include, at 340, determining whether there is a new data unit in the first sublayer. If there is a new data unit in the first sublayer, then the method may include, at 342, determining whether the first sublayer buffer is empty. If the first sublayer buffer is not empty, then the method may include, at 348, storing the data unit in the first sublayer buffer and returning to step 340. If the first sublayer buffer is empty, then the method may proceed to step 350 discussed below.

If it is determined at 340 that there is not a new data unit in the first sublayer, then the method may include, at 344, determining whether a data unit has left the second sublayer buffer. If it is determined that a data unit has not left the second sublayer buffer, then the method may return to step 340. If it is determined at 344 that a data unit has left the second sublayer buffer, then the method may include, at 346, determining whether the first sublayer is empty. If the first sublayer buffer is empty, then the method may return to step 340. If it is determined at 346 that the first sublayer buffer is not empty, then the method may proceed to step 350 discussed below.

At 350, the method may include comparing the number of data units currently stored in the second sublayer buffer (RQL) with the QLT. For example, in an embodiment, the comparing 350 may be performed every time a data unit leaves the second sublayer buffer. According to an embodiment, if it is determined that RQL is not less than QLT at 355, then the method may return to step 340.

If it is determined that RQL is less than QLT at 355, then the method may include, at 360, requesting, from a first sublayer flow-queue scheduler, the transfer of the data unit and/or transferring the data unit from the first sublayer to the second sublayer. The method may then include, at 370, queuing or storing the data unit in the second sublayer buffer.

According to certain embodiments, the data unit may be a SDU. In an embodiment, when the first sublayer SDU arrives at the second sublayer, the SDU may be formatted first as a first sublayer PDU, then as second sublayer SDU and stored as such at the tail of the second sublayer FIFO queue. The SDU may also be segmented into second sublayer PDUs, and fragments of the SDU may end up concatenated with fragments of other SDUs, possibly from other flows, in a common second sublayer PDU.

In one embodiment, in unacknowledged mode (e.g., RLC-UM), an SDU may be removed from the second sublayer SDU buffer when all the corresponding PDUs, and its tail PDU, have been transmitted over the wireless medium. According to an embodiment, in acknowledged mode (e.g., RLC-AM), an SDU may be removed from the second sublayer SDU buffer when all the corresponding PDUs have been acknowledged by the receiver. In one embodiment, the comparing 350 may include comparing the RQL and QLT again after the data unit transfer from the first sublayer to the second sublayer is complete, and then may be repeatedly compared until RQL and QLT are found to be equal.

In an embodiment, the comparing 350 may include comparing the RQL and QLT when a new data unit arrives to the first sublayer and finds its buffer empty. In this case, if RQL<QLT, the data unit may move immediately from the first sublayer to the second sublayer buffer, otherwise it may be stored in the first sublayer buffer.

Figure 4:
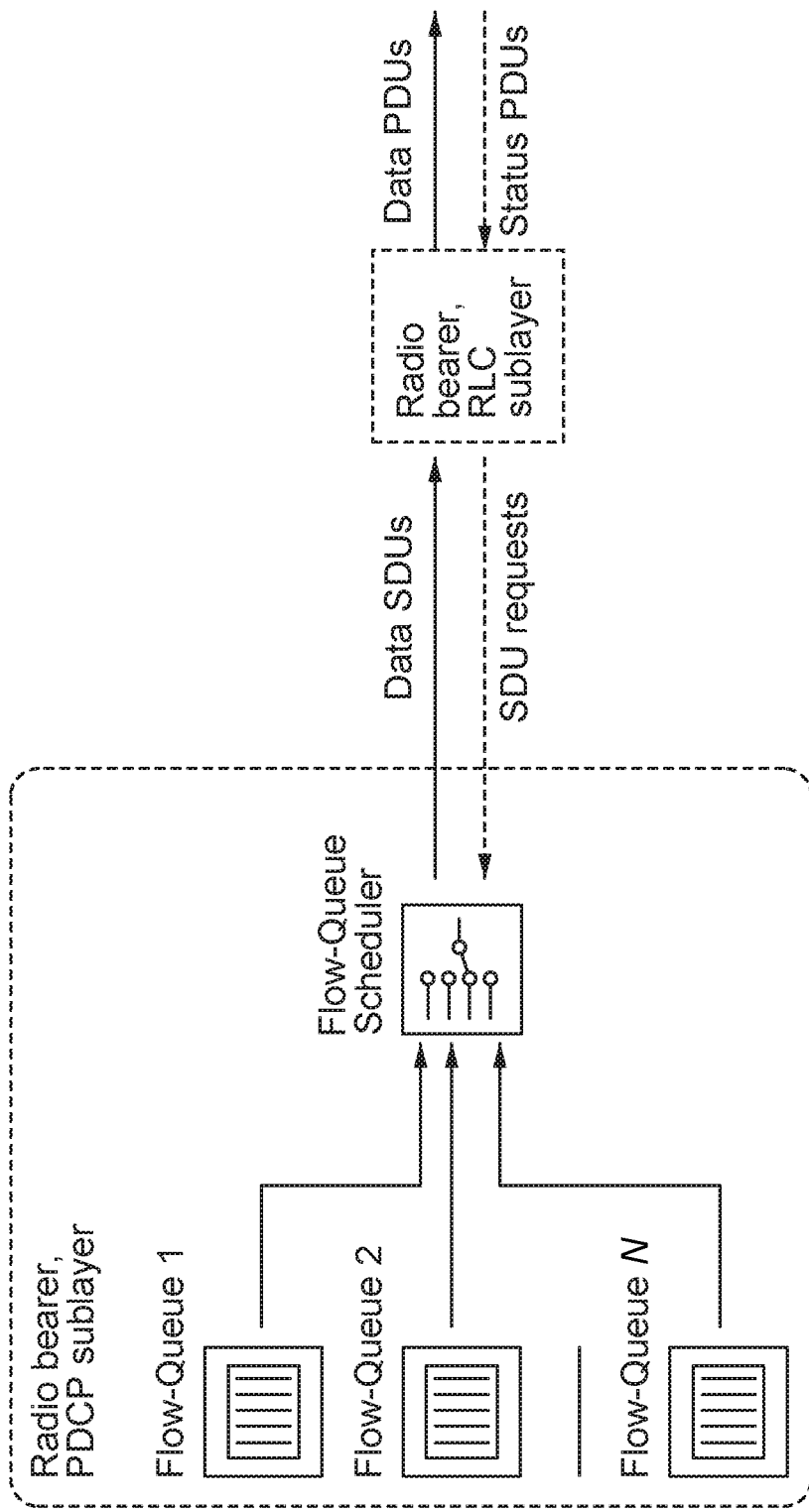
FIG. 4 illustrates an example block diagram of a system or architecture, according to an embodiment.

FIG. 4 illustrates an example block diagram of a system or architecture, according to an embodiment. In particular, FIG. 4 illustrates data units carrying user data flowing downstream from left to right, and control messages flowing upstream from right to left. In an embodiment, the transfer of data units into the RLC sublayer, where they are first buffered as RLC SDUs, happens only when the RLC sublayer 410 provides explicit indication to the PDCP sublayer 400 that the RLC buffer has the necessary space available. The total RLC buffer space is defined by the Queue Length Threshold (QLT). As discussed above, space may be considered available when the RLC Queue Length (RQL) is smaller than QLT. The RLC sublayer 410 transmits RLC data PDUs when the underlying MAC sublayer finds transmission opportunities for the radio bearer over the air interface. With RLC-UM, an RLC SDU is removed from the RLC buffer when all the PDUs into which it was segmented have been transmitted. With RLC-AM, the removal occurs only when all PDUs have been acknowledged by the RLC-AM receiver across the wireless link. As shown in FIG. 4, the acknowledgments may be carried by status PDUs.

Certain embodiments may include two processes that run independently but share some data structures and/or physical resources. One process is directed to "SDU Arrival" and the other is directed to "SDU Departure". Whenever one process accesses a shared data structure, it may lock that data structure to block access by the other process. The blocking process unlocks the data structure as soon as it is done using it.

Figure 5:
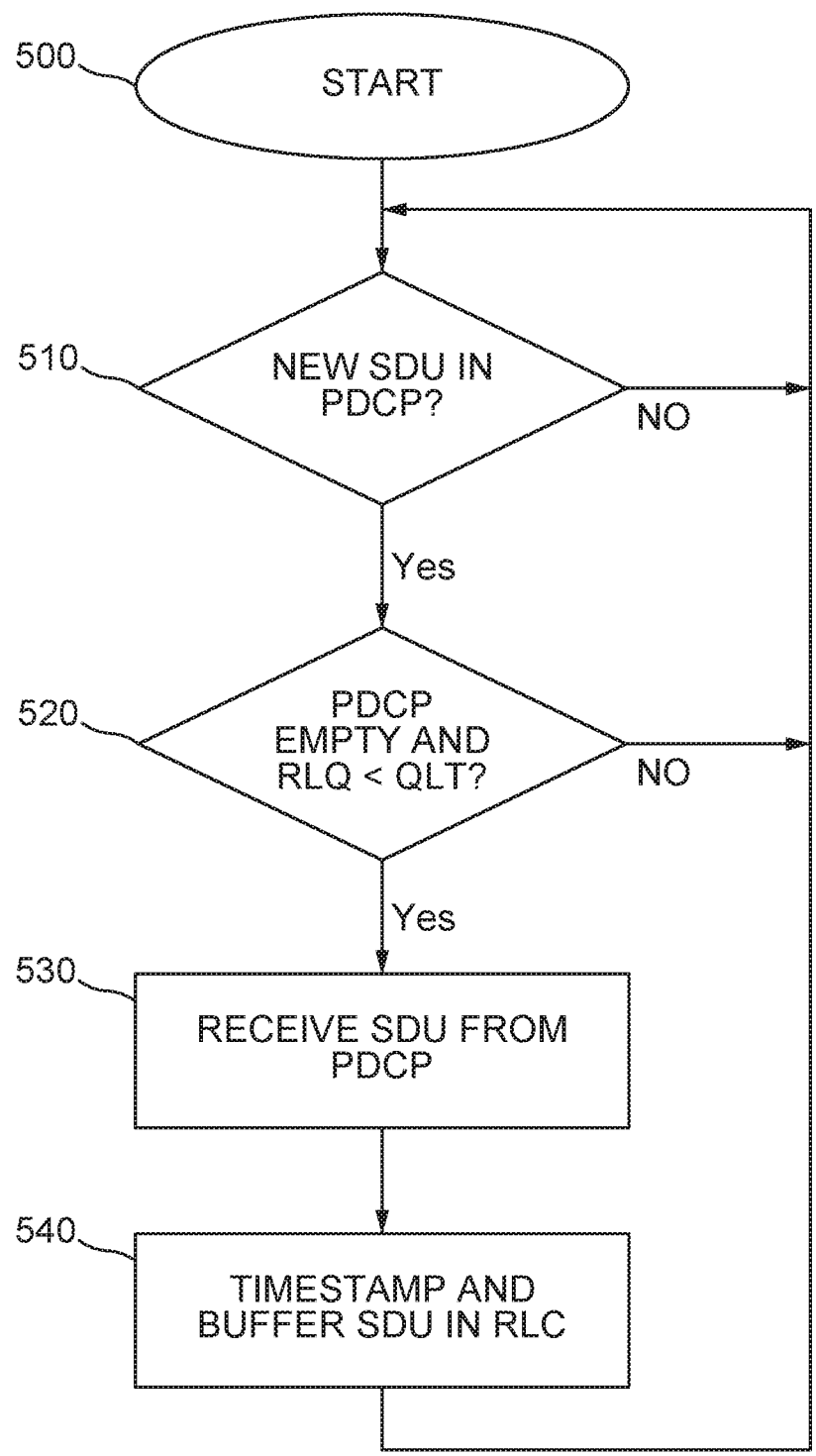
FIG. 5 illustrates an example flow diagram of a method, according to another embodiment.

FIG. 5 illustrates an example flow chart depicting the operation of the "SDU Arrival" process, according to an embodiment. As illustrated in FIG. 5, the method may start at step 500, then moves onto step 510, where it is determined whether the PDCP sublayer has received a new SDU. If it is determined that a new SDU has not been received, then the method may return to step 510. If it has received a new SDU, then the method may include, at 520, determining whether the PDCP buffer of the radio bearer is currently empty and whether the occupancy of the RLC buffer (RQL) is currently lower than the admission threshold QLT for new RLC SDUs. If not, then the method may return to step 510. If yes, then the method may include, at 530, receiving the data unit from the PDCP sublayer and formatting it as an RLC SDU. The method may also include, at 540, setting the arrival timestamp of the new SDU equal to the current system time and queueing the SDU to the RLC buffer, together with the timestamp, and returning to step 510.

Figure 6:
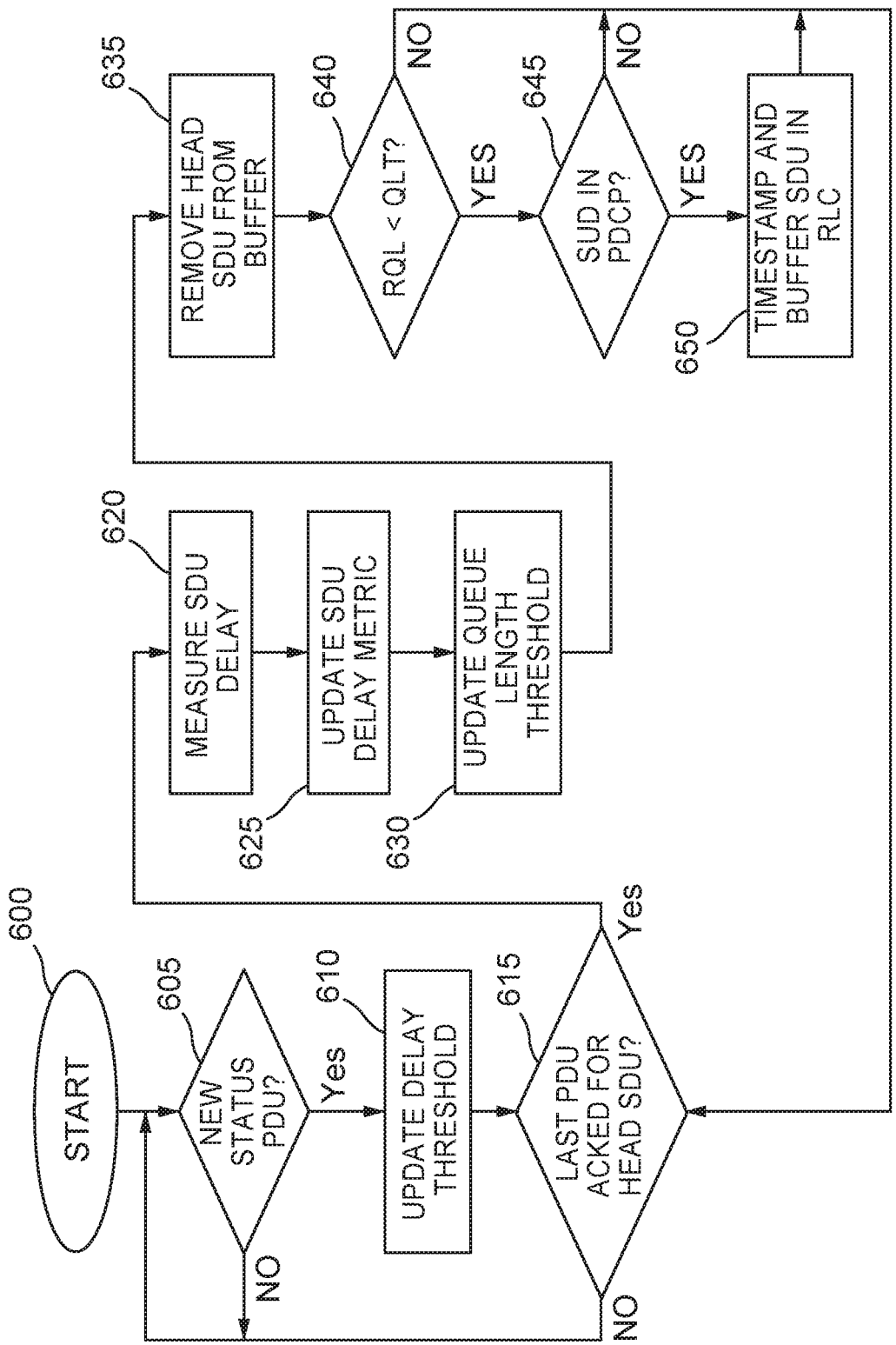
FIG. 6 illustrates an example flow diagram of a method, according to another embodiment.

FIG. 6 illustrates an example flow chart depicting the operation of the "SDU Departure" method in the case of RLC-AM, according to an embodiment. As illustrated in FIG. 6, the method starts at step 600, and then, at 605, includes checking whether the RLC sublayer has received a new status PDU from the underlying MAC sublayer. If a new status PDU has been received, the method may include, at 610, measuring the time gap between the arrival of the status PDU and the arrival of the previous status PDU. If the time gap sample is validated as meaningful (e.g., because the RLC buffer has never been empty since the collection of the previous sample), it is used to update the weighted moving average ATG. ATG is then multiplied by the fixed multiplier FMX to obtain the new value of the delay threshold DLT (DLT=ATG·FMX). If a new status PDU has not been received, then the method may return to step 605 to check again. The method may then include, at 615, checking whether the status PDU that was just received acknowledges the tail PDU of at least one RLC SDU. If yes, the method may proceed to step 620, otherwise the method may return to step 605.

The method may further include, at 620, collecting a delay sample for the head SDU acknowledged by the status PDU that was just received, as the difference between the current system time and the arrival timestamp found with the SDU. The method may then include, at 625, using the new delay sample to update the delay metric DLM that is used for control of the buffer threshold QLT. For example, the new delay sample may be compared to the running minimum of the delay samples collected since the start of the last sampling period of minimum duration DMT. If it is smaller, the new delay sample becomes the new minimum. As a first alternative, the new delay sample may be compared to the running maximum of the delay samples collected during the current sampling period. As a second alternative, the delay sample may be added to a sample accumulator that was reset at the beginning of the current sampling period. As a third alternative, the new delay sample may be added to an exponential weighted moving average of the delay samples collected since the radio bearer was established.

After updating the SDU delay metric, the method may then include, at 630, checking if a time DMT has elapsed since the previous comparison of the DLM with the delay threshold DLT. If the time since the last execution of the comparison is equal to or longer than DMT, a new comparison may take place and the timer for execution of the comparison is reset. If DLM≥DLT, the queue length threshold may be reduced, for example either by a fixed amount or by a fixed fraction of its current value. The reduction may be bounded by a minimum QLT value that is deemed necessary for the RLC to function properly. If instead DLM<DLT, QLT may be increased, either by a fixed amount or by a fixed fraction of its current value. The increase may be bounded by a maximum QLT that is deemed sufficient for the RLC to fully utilize the highest bandwidth that the bearer can receive. The binary decision based on the DLM comparison with a single value of DLT is only one example of instantiation of a rule for control of QLT. Other rules that involve multiple thresholds and an extended set of options for computing the new value of QLT may also be applied, according to other embodiments. The process then moves to step 635.

Continuing with FIG. 6, at 635, the method may include removing the head SDU from the SDU buffer, then at 640, checking if the current length of the RLC queue (RQL) is smaller than QLT. If yes, the method may move to step 645, otherwise it returns to step 615 to check if the new head SDU also had its tail PDU acknowledged by the last status PDU received. At step 645, the method may include checking if there is at least one PDCP SDU stored in the PDCP buffer. If yes, method may continue to step 650. Otherwise, the method may move back to step 615 to determine if the new head SDU in the RLC buffer also had its tail PDU acknowledged by the last arrived status PDU. At step 650, the method may include requesting the head SDU from the PDCP buffer as instantly designated by the PDCP flow scheduler, converting it into an RLC SDU, and storing it into the RLC SDU buffer together with a timestamp that is set equal to the current system time. Then, the method may return to step 615.

Figure 7:
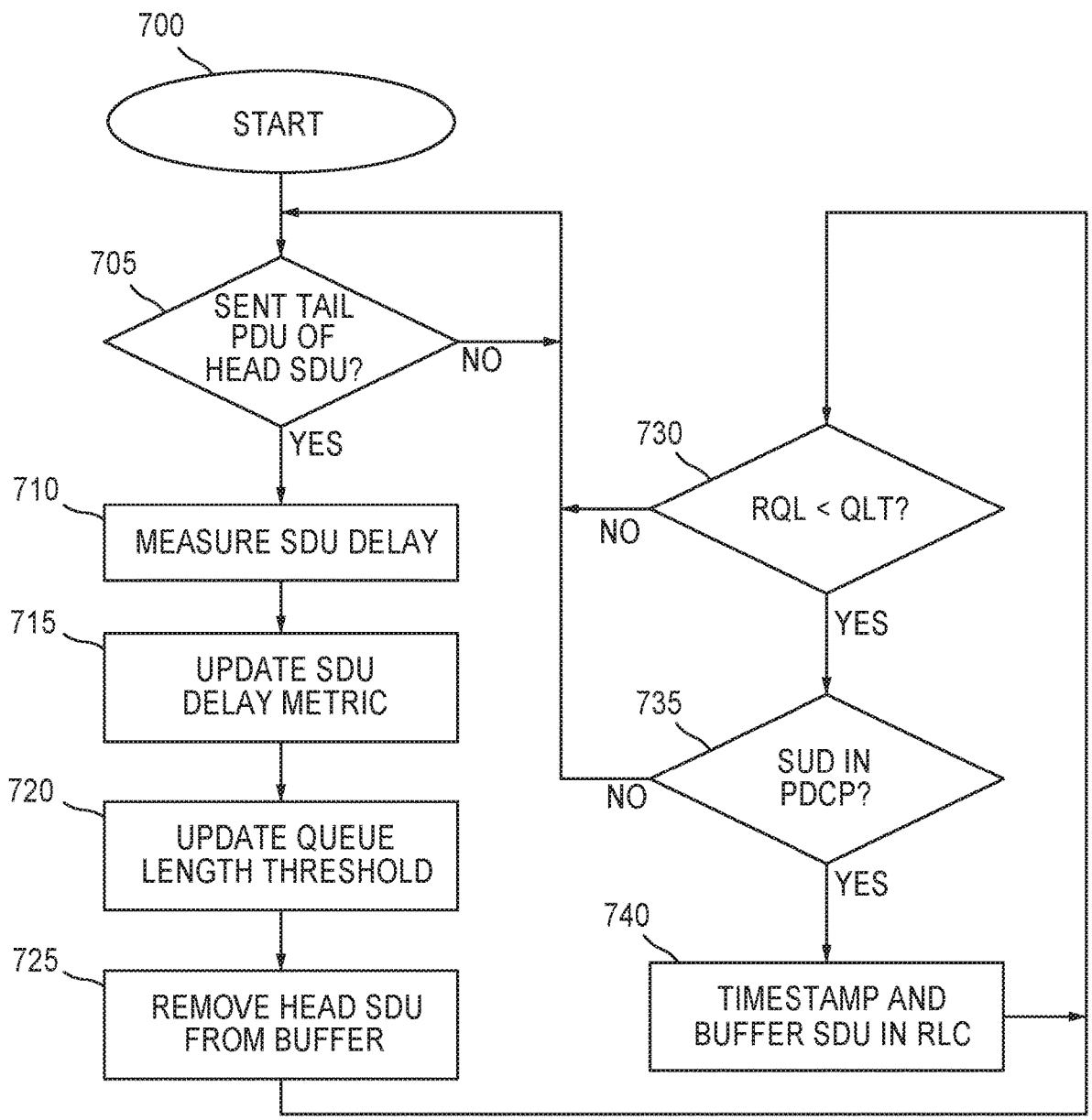
FIG. 7 illustrates an example flow diagram of a method, according to another embodiment.

FIG. 7 illustrates an example flow chart depicting the operation of the "SDU Departure" method in the case of RLC-UM, according to an embodiment. Compared to the RLC-AM case, the SDU delay in RLC-UM does not include the time that the tail PDU of the SDU waits for arrival of the status PDU with the corresponding acknowledgment. There is, therefore, no need to adjust the delay threshold DLT to the measured time gap between consecutive status PDU arrivals.

As illustrated in FIG. 7, the SDU Departure process for RLC-UM starts at step 700, then moves to step 705 where the method includes checking if the RLC sublayer has transmitted the tail PDU of the head SDU in the SDU buffer. If yes, the method moves to step 710, otherwise it returns to step 705. The method may include, at 710, measuring the delay of the head SDU by subtracting the timestamp of the SDU from the current system time. The method may then include, at 715, using the new delay sample to update the delay metric DLM that may be used for control of the buffer threshold QLT. For example, the new delay sample may be compared to the running minimum of the delay samples collected since the start of the last sampling period. If smaller, the new delay sample may become the new minimum. As a first alternative, the new delay sample may be compared to the running maximum of the delay samples collected during the current sampling period. As a second alternative, the delay sample may be added to a sample accumulator that was reset at the beginning of the current sampling period. As a third alternative, the new delay sample may be added to an exponential weighted moving average of the delay samples collected since the radio bearer was established.

After updating the SDU delay metric, the method may include, at step 720, checking if a time DMT has elapsed since the previous comparison of the DLM with the delay threshold DLT. If the time since the last execution of the comparison is longer than DMT, a new comparison takes place and the timer for execution of the comparison is reset. If DLM≥DLT, the queue length threshold may be reduced, for example either by a fixed amount or by a fixed fraction of its current value. The reduction may be bounded by a minimum QLT value that is deemed necessary for the RLC to function properly. If instead DLM<DLT, then QLT may be increased, for example either by a fixed amount or by a fixed fraction of its current value. The increase may be bounded by a maximum QLT that is deemed sufficient for the RLC to fully utilize the highest bandwidth that the bearer can receive. The binary decision based on the DLM comparison with a single value of DLT is only one example of instantiation of the rule for control of QLT. Other rules that involve multiple thresholds and an extended set of options for setting the new value of QLT may also be applied, according to other embodiments.

Continuing with FIG. 7, at 725, the method may include removing the head SDU from the SDU buffer. The method may then include, at 730, comparing the current length RQL of the RLC queue with the queue length threshold QLT. If RQL is smaller than QLT, the method may include, at 735, checking whether another PDCP SDU is available in the PDCP flow queueing buffer for transfer to the RLC buffer. If there is not another PDCP SDU available, the method may return to step 705. If a PDCP SDU is available for transfer to the RLC buffer, then the method may include, at 740, setting the timestamp of the new RLC SDU and storing the SDU and its timestamp into the RLC buffer. Then, the method may return to step 730 to check if another SDU can be moved from the PDCP buffer to the RLC buffer.

Figure 8:
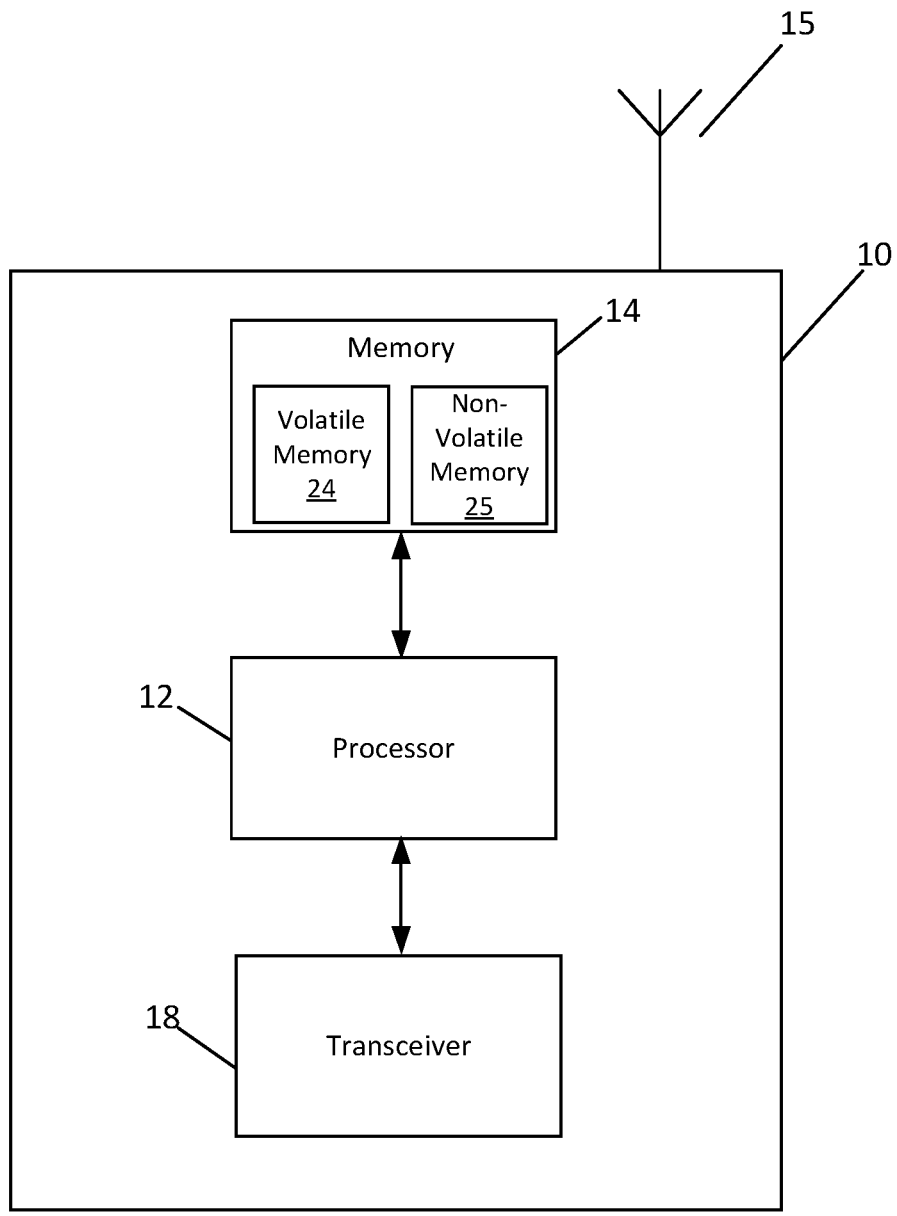
FIG. 8 illustrates a block diagram of an apparatus, according to one embodiment.

FIG. 8 illustrates an example of an apparatus 10 according to an embodiment. In an embodiment, apparatus 10 may be a node, host, or server in a communications network or serving such a network. For example, apparatus 10 may be an application server, base station, a node B, an evolved node B, 5G node B (gNB) or access point, next generation node B (NG-NB), WLAN access point, mobility management entity (MME), or subscription server associated with a radio access network, such as a UMTS network, LTE network or 5G radio access technology. It should be noted that one of ordinary skill in the art would understand that apparatus 10 may include components or features not shown in FIG. 8.

As illustrated in FIG. 8, apparatus 10 may include a processor 12 for processing information and executing instructions or operations. Processor 12 may be any type of general or specific purpose processor. While a single processor 12 is shown in FIG. 8, multiple processors may be utilized according to other embodiments. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Processor 12 may perform functions associated with the operation of apparatus 10 which may include, for example, precoding of antenna gain/phase parameters, encoding and decoding of individual bits forming a communication message, formatting of information, and overall control of the apparatus 10, including processes related to management of communication resources.

Apparatus 10 may further include or be coupled to a memory 14 (internal or external), which may be coupled to processor 12, for storing information and instructions that may be executed by processor 12. Memory 14 may include volatile memory 24 and/or non-volatile memory 25. Therefore, memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, volatile memory 24 may include random access memory (RAM), such as dynamic or static RAM. Non-volatile memory 25 may include, for example, read only memory (ROM), flash memory, and/or mechanical disks, such as hard disks or optical disks. Thus, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink). As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly.

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

In one embodiment, apparatus 10 may be a network node or server, such as a base station, node B, eNB, 5G node B or access point, or next generation node B (NG-NB), for example. According to certain embodiments, apparatus 10 may be controlled by memory 14 and processor 12 to perform the functions associated with embodiments described herein. For example, in some embodiment, apparatus 10 may be controlled by memory 14 and processor 12 to perform at least any of the methods illustrated in FIG. 3a, 3b, 5, 6, or 7.

According to an embodiment, apparatus 10 may be controlled by memory 14 and processor 12 to determine whether a first sublayer of a link layer of a wireless access link has received a new SDU, and/or to receive the SDU at the first sublayer. In certain embodiments, the first sublayer may be a PDCP sublayer; however, in other embodiments, the first sublayer may be any protocol layer including, for example, a protocol layer where flow queuing is available.

In one embodiment, when the first sublayer SDU is received at the first sublayer of the wireless access link, apparatus 10 may be controlled by memory 14 and processor 12 to compare a number of SDUs currently stored in the second sublayer buffer with a QLT that defines or represents the total amount of space in the second sublayer buffer. According to one embodiment, number of SDUs currently stored in the second sublayer buffer may be compared with the QLT every time a SDU leaves the second sublayer buffer. In certain embodiments, when the number of SDUs currently stored in the second sublayer buffer is less than the QLT, apparatus 10 may be controlled by memory 14 and processor 12 to transfer the first sublayer SDU to the second sublayer. It is noted that, in some embodiments, the second sublayer may be a RLC sublayer; however, in other embodiments, the second sublayer may be any protocol layer including, for example, a protocol layer where flow queuing is unavailable.

According to an embodiment, when the first sublayer SDU is received at the second sublayer, apparatus 10 may be controlled by memory 14 and processor 12 to format the first sublayer SDU as a second sublayer SDU, and to queue the second sublayer SDU to the second sublayer buffer together with an arrival time stamp that is equal to the system time when the second sublayer SDU arrived at the second sublayer buffer. In one embodiment, apparatus 10 may be controlled by memory 14 and processor 12 to periodically determine, compute or update a delay metric (DLM) based on at least one delay sample that is obtained, for each SDU, as a difference between a time of departure of the SDU from the second sublayer buffer and the arrival time stamp. According to certain embodiments, apparatus 10 may be controlled by memory 14 and processor 12 to periodically obtain the delay metric by setting the delay metric to be an average of the delay samples collected over a given time interval, or to be a minimum delay sample collected during the given time interval, or to be a maximum delay sample collected during the given time interval, or to be a moving average of the delay samples.

In certain embodiments, every time the delay metric is computed or after a certain duration of time has elapsed, apparatus 10 may be controlled by memory 14 and processor 12 to compare the delay metric (DLM) with a delay threshold (DLT). According to an embodiment, apparatus 10 may then be controlled by memory 14 and processor 12 to modify the QLT based on a result of the comparison between the delay metric (DLM) and the delay threshold (DLT).

In some embodiments, when the delay metric (DLM) is greater than or equal to the delay threshold (DLT), apparatus 10 may be controlled by memory 14 and processor 12 to modify the QLT by reducing the QLT by a fixed amount or by a fixed fraction of a current value of the QLT. In other embodiments, when the delay metric (DLM) is less than the delay threshold (DLT), apparatus 10 may be controlled by memory 14 and processor 12 to modify the QLT by increasing the QLT by a fixed amount or by a fixed fraction of a current value of the QLT. According to certain embodiments, apparatus 10 may be controlled by memory 14 and processor 12 to obtain the delay threshold by multiplying a weighted moving average (ATG) with a fixed multiplier (FMX). In an embodiment, the weighted moving average (ATG) may be based on a time gap between an arrival of a status PDU and an arrival of a previous status PDU.

In one embodiment, when in unacknowledged mode (e.g., RLC-UM), apparatus 10 may be controlled by memory 14 and processor 12 to remove the second sublayer SDU from the second sublayer buffer only when all corresponding PDUs including its tail PDU have been transmitted over the wireless access link. In another embodiment, when in acknowledged mode (e.g., RLC-AM), apparatus 10 may be controlled by memory 14 and processor 12 to remove the second sublayer SDU from the second sublayer buffer only when a receiver has acknowledged all corresponding PDUs.

It is noted that embodiments of the invention provide significant performance benefits over conventional approaches, for example, by combining a flow-queuing arrangement in the PDCP sublayer with a dynamically sized RLC buffer. For instance, certain embodiments can reconcile maximum FTP throughput with an average PING delay that is very close to the minimal achievable and 50% smaller than that obtained from an oversized, static configuration of the RLC buffer.

For example, embodiments of systems, methods and apparatuses described herein enable reductions of queuing delay in the RLC buffer that are particularly useful to low-throughput interactive applications like IP telephony, online gaming, remote desktop control, and automatic remote control of mechanical devices, specifically in cases where the packet flows of those applications can share the same wireless access link, or radio bearer, with throughput-intensive applications like adaptive-streaming video and bulk file transfer. These scenarios are common, for example, when the mobile device serves as an access point for multiple user devices, as in a connected vehicle or a mobile hotspot. In addition, these scenarios may also occur increasingly with individual user devices that can run multiple applications in the foreground, or even in plain mobile user devices, when they exchange files with the network in the background while running an interactive application in the foreground.

In view of the above, embodiments provide several technical effects and/or advantages. For example, certain embodiments can reduce sojourn time or latency of data packets in a radio access network. As a result, certain embodiments can improve performance and throughput of devices and network nodes including, for example, base stations, eNBs, gNBs and/or UEs. Accordingly, the use of embodiments of the invention result in improved functioning of communications networks and their nodes.

Certain embodiments discussed herein are described in the context of a RAN protocol stack including a PDCP sublayer, RLC sublayer, and MAC sublayer. It should be noted, however, that certain embodiments are also applicable to any protocol stack. For example, some embodiments are also applicable to any protocol layer where flow queueing for latency reduction is possible and any other protocol layer where flow queueing is not possible.

Figure 9:
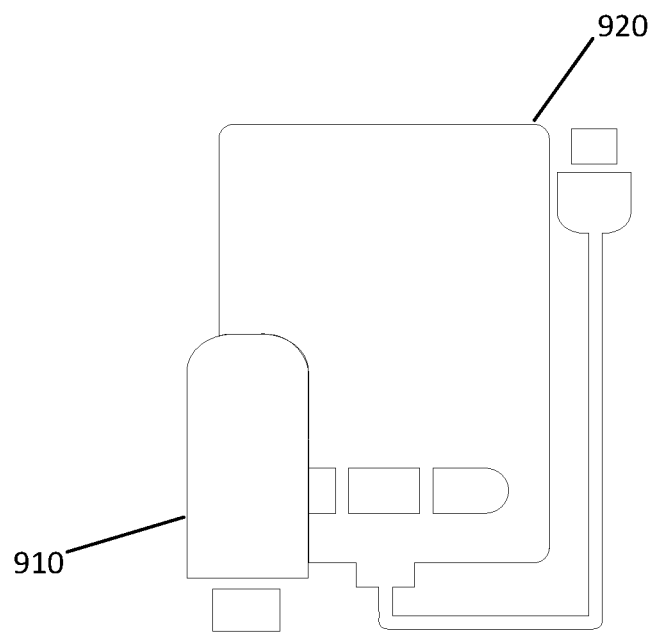
FIG. 9 illustrates some examples of storage media, according to some embodiments.
Figure 9:
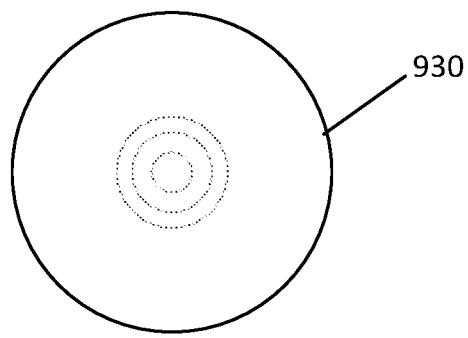

In some embodiments, the functionality of any of the methods, processes, signaling diagrams, or flow charts described herein may be implemented by software and/or computer program code or portions of code stored in memory or other computer readable or tangible media, and executed by a processor. FIG. 9 illustrates some examples of computer storage media in which software or computer program code may be stored. For example, FIG. 9 illustrates a USB memory or flash drive 910, a hard drive 920, or a CD 930 for storing software or computer program code. It is noted that FIG. 9 illustrates some examples of storage media, but any other media capable of storing computer programs may be used according to other embodiments.

In certain embodiments, an apparatus may be included or be associated with at least one software application, module, unit or entity configured as arithmetic operation(s), or as a program or portions of it (including an added or updated software routine), executed by at least one operation processor. Programs, also called computer program products or computer programs, including software routines, applets and macros, may be stored in any apparatus-readable data storage medium and include program instructions to perform particular tasks.

A computer program product may comprise one or more computer-executable components which, when the program is run, are configured to carry out embodiments described herein. The one or more computer-executable components may include at least one software code or portions of code. Modifications and configurations required for implementing the functionality of an embodiment may be performed as routine(s), which may be implemented as added or updated software routine(s). In some embodiments, software routine(s) may be downloaded into the apparatus.

Software or a computer program code or portions of code may be in a source code form, object code form, or in some intermediate form, and may be stored in some sort of carrier, distribution medium, or computer readable medium, which may be any entity or device capable of carrying the program. Such mediums may include non-volatile storage, read-only memory, a hard disk or optical disk, photoelectrical and/or electrical carrier signal, telecommunications signal, and/or software distribution package, for example. Depending on the processing power needed, the computer program may be executed in a single electronic digital device or it may be distributed amongst a number of devices or computers. The computer readable medium or computer readable storage medium may be a non-transitory medium.

In other embodiments, the functionality may be performed by hardware, for example through the use of an application specific integrated circuit (ASIC), a programmable gate array (PGA), a field programmable gate array (FPGA), or any other combination of hardware and software. In yet another embodiment, the functionality may be implemented as a signal, a non-tangible means that can be carried by an electromagnetic signal downloaded from the Internet or other network.

According to an embodiment, an apparatus, such as a node, device, or a corresponding component, may be configured as a computer or a microprocessor, such as single-chip computer element, or as a chipset, including at least a memory, such as RAM and/or ROM, for providing storage capacity used for arithmetic operation(s) and an operation processor for executing the arithmetic operation.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A method, comprising:
when a buffer of a first sublayer of a wireless access link is empty and there is a new data unit in the first sublayer or when the first sublayer buffer is not empty and a data unit leaves a second sublayer buffer, comparing a number of data units currently stored in the second sublayer buffer with a queue length threshold,
wherein the queue length threshold defines a total amount of space in the second sublayer buffer; and
when the number of data units currently stored in the second sublayer buffer is less than the queue length threshold, transferring the new data unit from the first sublayer to the second sublayer,
the method further comprising:
when the new data unit is received at the second sublayer, formatting the new data unit as a second sublayer data unit;
queueing the second sublayer data unit to a second sublayer buffer together with an arrival time stamp equal to a system time when the second sublayer data unit arrived at the second sublayer buffer; and
periodically computing a delay metric based on at least one delay sample that is obtained, for each data unit, as a difference between a time of departure of the data unit from the second sublayer buffer and the arrival time stamp.

2. The method according to claim 1, further comprising:
every time the delay metric is computed or after a certain duration of time has elapsed, comparing the delay metric with a delay threshold; and
modifying the queue length threshold based on a result of the comparison between the delay metric and the delay threshold.

3. The method according to claim 2, further comprising:
when the delay metric is greater than or equal to the delay threshold, the modifying comprises reducing the queue length threshold by a fixed amount or by a fixed fraction of a current value of the queue length threshold; or
when the delay metric is less than the delay threshold, the modifying comprises increasing the queue length threshold by a fixed amount or by a fixed fraction of a current value of the queue length threshold.

4. The method according to claim 1, wherein the periodically computing of the delay metric comprises setting the delay metric to be an average of the delay samples collected over a given time interval, or to be a minimum delay sample collected during the given time interval, or to be a maximum delay sample collected during the given time interval, or to be a moving average of the delay samples.

5. The method according to claim 1, further comprising, when in acknowledged mode, removing the new data unit from the second sublayer buffer only when all corresponding packet data units have been acknowledged by a status protocol data unit from a receiver.

6. The method according to claim 5, wherein the delay threshold is obtained by multiplying a weighted moving average with a fixed multiplier, wherein the weighted moving average is based on a time gap between an arrival of the status protocol data unit and an arrival of a previous status protocol data unit.

7. The method according to claim 1, further comprising, when in unacknowledged mode, removing the new data unit from the second sublayer buffer only when all corresponding packet data units including its tail packet data unit have been transmitted over the wireless access link.

8. The method according to claim 1, wherein the comparing of the number of data units with the queue length threshold further comprises performing the comparison every time a data unit leaves the second sublayer buffer.

9. The method according to claim 1, wherein the first sublayer comprises a packet data convergence protocol sublayer, wherein the second sublayer comprises a radio link control sublayer, and wherein the new data unit comprises a service data unit.

10. An apparatus, comprising:
at least one processor; and
at least one memory including computer program code,
the at least one memory and the computer program code configured, with the at least one processor, to cause the apparatus at least to
when a buffer of a first sublayer of a wireless access link is empty and there is a new data unit in the first sublayer or when the first sublayer buffer is not empty and a data unit leaves a second sublayer buffer, compare a number of data units currently stored in the second sublayer buffer with a queue length threshold,
wherein the queue length threshold defines a total amount of space in the second sublayer buffer;
when the number of data units currently stored in the second sublayer buffer is less than the queue length threshold, transfer the new data unit from the first sublayer to the second sublayer; and
periodically compute a delay metric based on at least one delay sample that is obtained, for each data unit, as a difference between a time of departure of the data unit from the second sublayer buffer and an arrival time stamp equal to a system time when the second sublayer data unit arrived at the second sublayer buffer.

11. A computer program, embodied on a non-transitory computer readable medium, wherein the computer program is configured to control a processor to cause an apparatus at least to:
when a buffer of a first sublayer of a wireless access link is empty and there is a new data unit in the first sublayer or when the first sublayer buffer is not empty and a data unit leaves a second sublayer buffer, compare a number of data units currently stored in the second sublayer buffer with a queue length threshold,
wherein the queue length threshold defines a total amount of space in the second sublayer buffer;
when the number of data units currently stored in the second sublayer buffer is less than the queue length threshold, transfer the new data unit from the first sublayer to the second sublayer; and
periodically compute a delay metric based on at least one delay sample that is obtained, for each data unit, as a difference between a time of departure of the data unit from the second sublayer buffer and an arrival time stamp equal to a system time when the second sublayer data unit arrived at the second sublayer buffer.

* * * * *